US011758062B1

(12) United States Patent
Takuwa

(10) Patent No.: US 11,758,062 B1
(45) Date of Patent: Sep. 12, 2023

(54) IMAGE FORMING APPARATUS

(71) Applicant: TOSHIBA TEC KABUSHIKI KAISHA, Tokyo (JP)

(72) Inventor: Noriyuki Takuwa, Yokohama Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/677,766

(22) Filed: Feb. 22, 2022

(51) Int. Cl.
*H04N 1/00* (2006.01)
*H04N 1/04* (2006.01)

(52) U.S. Cl.
CPC ..... *H04N 1/00496* (2013.01); *H04N 1/00352* (2013.01); *H04N 1/04* (2013.01); *H04N 2201/0094* (2013.01)

(58) Field of Classification Search
CPC ........... G03G 15/5016; G03G 15/2039; G03G 15/5079; G03G 2215/00109; G03G 15/50; G03G 15/556; G03G 21/00; G03G 15/5004; G03G 15/55; G03G 15/6508; G03G 15/6552; G03G 15/70; G03G 21/1628; G03G 2221/1687; G03G 15/6502; G03G 15/08; G03G 15/0894; H04N 1/00384; H04N 1/00885; H04N 1/00896; H04N 2201/0091; H04N 1/00352; H04N 1/00557; H04N 1/0071; H04N 1/00713; H04N 1/00737; H04N 1/0075; H04N 1/00769; H04N 1/00795; H04N 1/00814; H04N 1/00816; H04N 1/00891; H04N 1/02835; H04N 1/0312; H04N 1/1017; H04N 1/193; H04N 1/1934; H04N 1/40056; H04N 1/442; H04N 2201/0081; H04N 2201/03112; H04N 2201/03125; H04N 2201/03141; H04N 2201/03145; H04N 5/23293; H04N 5/2628; B65H 2405/1111; B65H 2405/32; B65H 2601/11; B65H 31/02; B65H 31/3063; B65H 45/18; G06K 15/005;
(Continued)

(56) References Cited

U.S. PATENT DOCUMENTS 4,947,481 A * 8/1990 Ikedo ................. G11B 7/08582
720/675
10,750,040 B2 * 8/2020 Oka ................... H04N 1/00766
(Continued)

FOREIGN PATENT DOCUMENTS

| JP | H09244321 A | 9/1997 |
| JP | 2014030076 A | 2/2014 |
| JP | 2017074785 A | 4/2017 |

*Primary Examiner* — Negussie Worku
(74) *Attorney, Agent, or Firm* — Kim & Stewart LLP

(57) ABSTRACT

According to one embodiment, an image forming apparatus includes a housing, a first sensor configured to detect a user in front of the housing, an illumination light configured to emit light in an illumination direction, and an opening and closing element configured to open and close a portion of the housing. A second sensor is configured to detect the opening and the closing of the opening and closing element. An adjuster is configured to change a detection distance of the first sensor and the illumination direction in conjunction with each other by physical movement. A controller is configured to turn on the illumination light when the opening and closing element is open, and turn off the illumination light when is closed.

16 Claims, 12 Drawing Sheets

(58) Field of Classification Search
CPC ........... G06K 15/1806; G06K 15/4065; G06K 15/408; G06K 15/407; A63F 13/213; A63F 13/42; A63F 2300/1006; A63F 2300/105; A63F 2300/1087; A63F 2300/6045; G06F 2203/04803; G06F 2203/04805; G06F 3/00; G06F 3/0346; G06F 3/03542; G06F 3/042; G06F 3/0481; G06F 3/0488
USPC ........................................................ 358/1.15
See application file for complete search history.

(56) References Cited

U.S. PATENT DOCUMENTS

| | | |
|---|---|---|
| 2003/0138280 A1 | 7/2003 | Namekawa et al. |
| 2005/0207777 A1* | 9/2005 | Takahashi .......... H04N 1/00896 399/88 |
| 2007/0264057 A1* | 11/2007 | Takuwa ............... G03G 15/161 399/297 |
| 2008/0170258 A1* | 7/2008 | Yamamura ......... H04N 1/32609 358/1.15 |
| 2009/0214247 A1* | 8/2009 | Takuwa ................. G03G 15/80 399/88 |
| 2011/0109937 A1* | 5/2011 | Fujiki ................. H04N 1/00885 358/1.15 |
| 2011/0135364 A1* | 6/2011 | Takuwa ............. G03G 15/6552 399/405 |
| 2011/0262186 A1* | 10/2011 | Takuwa ............. G03G 15/0126 399/223 |
| 2012/0127518 A1 | 5/2012 | Ogata et al. |
| 2012/0327458 A1 | 12/2012 | Baba et al. |
| 2013/0083344 A1* | 4/2013 | Funakawa .......... H04N 1/00127 358/1.14 |
| 2013/0329253 A1* | 12/2013 | Sasaki ................ H04N 1/00222 358/1.15 |
| 2015/0035440 A1* | 2/2015 | Spero ................... B60Q 1/1423 315/153 |
| 2016/0191746 A1* | 6/2016 | Yokoyama ............. G06V 40/10 358/1.14 |
| 2016/0381242 A1* | 12/2016 | Arakawa .......... H04N 1/00915 358/1.14 |
| 2018/0101210 A1 | 4/2018 | Fukui |
| 2019/0018621 A1* | 1/2019 | Akahira ................ G06F 3/1204 |
| 2019/0355355 A1 | 11/2019 | Tomita |
| 2021/0389187 A1 | 12/2021 | Odani |
| 2022/0113127 A1* | 4/2022 | Oeguen .................. G01B 11/14 |

* cited by examiner

IMAGE FORMING APPARATUS

FIELD

Embodiments described herein relate generally to an image forming apparatus.

BACKGROUND

An image forming apparatus provided with a human sensor to detect the presence or approach of a possible user is known. The image forming apparatus that is provided with a human sensor switches to a power save mode (e.g., a sleep or idle state) when not used for a long time, and then switches to a normal operating mode when a possible user is detected by the human sensor. This reduces power consumption but also shortens the apparent time required to return to the normal mode from the power save mode for the user.

DETAILED DESCRIPTION

In general, according to one embodiment, an image forming apparatus includes a housing, a first sensor configured to detect a user in front of the housing, and an illumination light configured to emit light in an illumination direction. The image forming apparatus has an opening and closing element that opens and closes a portion of the housing. A second sensor is configured to detect the opening and closing of the opening and closing element. An adjuster is configured to change a detection distance of the first sensor and the illumination direction of the illumination light in conjunction with each other by movement of the first sensor and the illumination light. A controller is configured to turn on the illumination light when the opening and closing element is detected as open by the second sensor, and turn off the illumination light when the opening and closing element is detected as closed by the second sensor.

Figure 1:
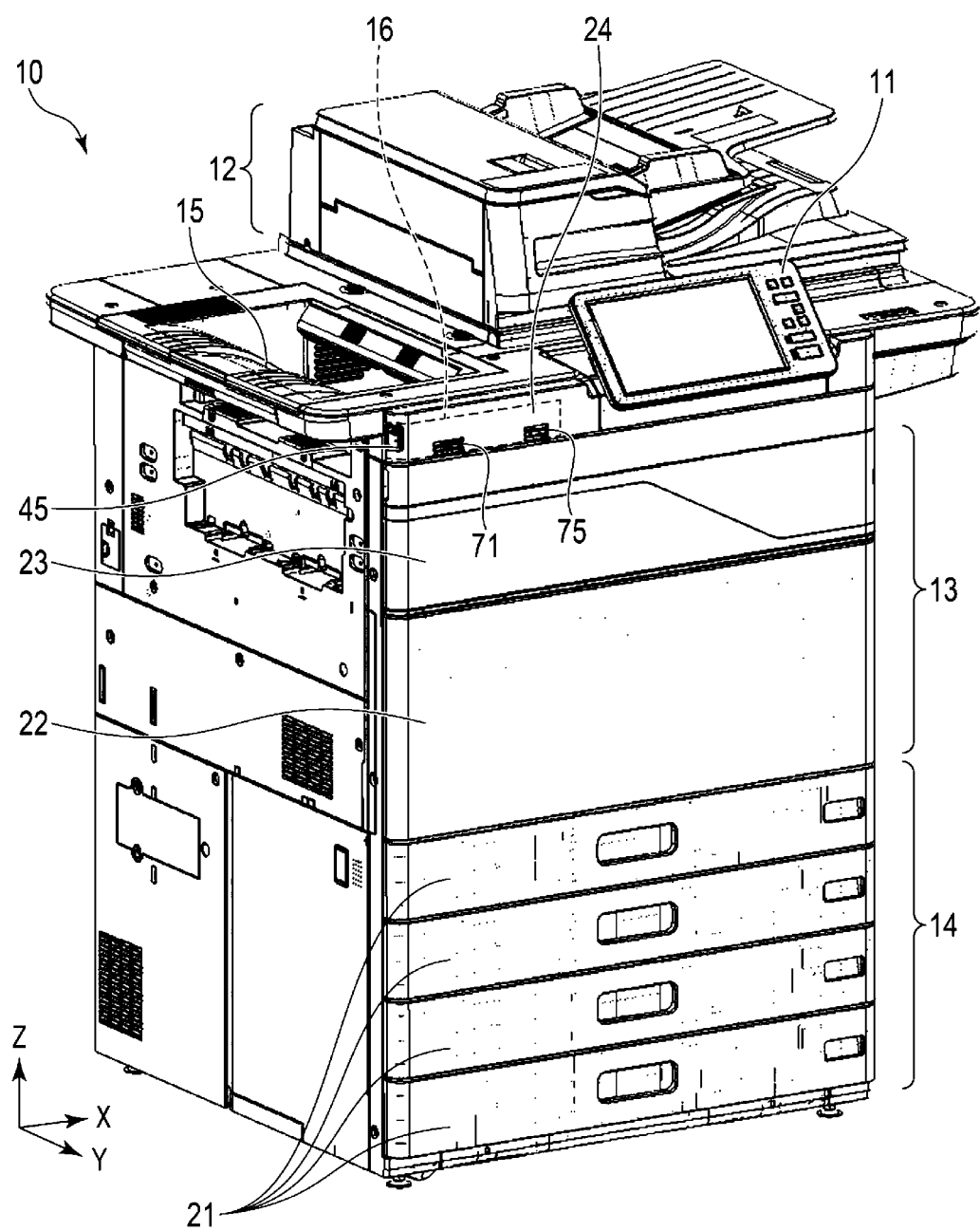
FIG. 1 is a perspective view of an image forming apparatus according to an embodiment.

Hereinafter, an image forming apparatus according to certain example embodiment will be described with reference to the drawings. FIG. 1 is a perspective view of an image forming apparatus 10 according to an embodiment.

Note that, in the drawings used for the description of the following embodiments, the scale of each part may be changed as appropriate. Furthermore, in the drawings certain aspects or components may be omitted for the sake of descriptive clarity.

For convenience of description, an X-Y-Z Cartesian coordinate system is defined as illustrated in FIG. 1. The Z direction is a vertical, longitudinal, or up-down direction. The +Z direction is an upward direction, and the −Z direction is a downward direction. The X and Y directions are horizontal or lateral directions. The Y direction is a depth direction or a front-rear direction of the image forming apparatus 10. The +Y direction is a frontward direction, and the −Y direction is a rearward direction. The X direction is a width direction or a left-right direction of the image forming apparatus 10. The left-right direction is based on the view seen by a user or the like from the front of the image forming apparatus 10. The +X direction is the rightward direction, and the −X direction is the leftward direction. In the following description, all directional expressions are based on the foregoing.

The image forming apparatus 10 is a Multi Function Peripheral (MFP) apparatus, for example, and it has a plurality of functions such as a printing function, a scanning function, and a copying function.

The image forming apparatus 10 includes an operation panel 11, a scanner unit 12, an image forming unit 13, a paper feed unit 14, a paper discharge unit 15, and a human sensor unit 16.

The operation panel 11 is arranged above and in front of the image forming unit 13, for example. The operation panel 11 receives instructions (operation instructions) for executing various functions of the image forming apparatus 10 and changing various setting information (parameters). For example, the operation panel 11 includes a touch panel, push buttons, and the like. The operation panel 11 is arranged at a height position that is easy for a user of general height to operate. The operation panel 11 is arranged near the center in the width direction (X direction).

The scanner unit 12 is arranged above the image forming unit 13 and behind the operation panel 11, for example. The scanner unit 12 uses a sensor such as a Contact Image Sensor (CIS), a Charge Coupled Devices (CCD), and the like to read an image recorded on a document or the like and generate image data therefrom.

The paper feed unit 14 includes a paper feed cassette 21 for containing paper. The paper feed unit 14 includes four paper feed cassettes 21, for example. The paper feed unit 14 feeds paper from one of the paper feed cassettes 21 to the image forming unit 13 for printing and/or other processing.

The image forming unit 13 is arranged above the paper feed unit 14. The image forming unit 13 prints an image on a paper fed from the paper feed unit 14 using toner based on the image data read by the scanner unit 12 or the image data received from an external device. The image forming unit 13 includes a photoconductor unit, a toner unit, and the like. In addition, the image forming unit 13 discharges the paper on which the image has been formed (printed) to the paper discharge unit 15 on the left side.

The paper discharge unit 15 receives the paper on which an image has been printed from the image forming unit 13 and stores or holds the paper. The paper discharge unit 15 is provided above the image forming unit 13 and on the left side of the scanner unit 12.

The human sensor unit 16 is arranged above the image forming unit 13. The human sensor unit 16 detects a user within a predetermined range in front of the image forming apparatus 10. The human sensor unit 16 may have an adjustable detection range (hereinafter referred to as a detection distance). The human sensor unit 16 can illuminate a predetermined area in front of the image forming apparatus 10. The human sensor unit 16 can also adjust the illumination direction in conjunction with the adjustment of the detection distance.

The image forming apparatus 10 further includes exterior covers such as, for example, a first front cover 22, a second front cover 23, and a sensor cover 24.

The first front cover 22 and the second front cover 23 cover the image forming unit 13. The first front cover 22 covers a portion of the image forming unit 13 that does not house regularly replaceable parts or parts that require regular access, and the second front cover 23 covers a portion of the image forming unit 13 that houses regularly replaceable parts such as the toner unit (e.g., a toner cartridge), the photoconductor units, and the like. The sensor cover 24 covers the human sensor unit 16.

Both the paper feed cassette 21 and the second front cover 23 are opening and closing elements that can be opened and closed with respect to the housing. With all of the paper feed cassettes 21 and the second front cover 23 closed, the image forming unit 13 and the paper feed unit 14 form a substantially rectangular parallelepiped housing.

The paper feed cassette 21 can be opened and closed for replenishing paper, clearing paper jams, and the like, for example. The paper feed cassette 21 is movable in the front-rear direction, and is pulled forward to be opened and pushed backward to be closed.

The first front cover 22 is fixed and not opened and closed. The second front cover 23 can be opened and closed for replacing toner units and photoconductor units, clearing paper jams, performing maintenance, and the like. For example, the second front cover 23 is pivotable around the axis of a shaft extending in the left-right direction at the lower end, and is moved down toward the front (front side) to open, and moved up to close.

The sensor cover 24 covers the human sensor unit 16. The sensor cover 24 is arranged on one side of the operation panel 11, for example, on the left side. Therefore, the human sensor unit 16 is arranged in front of and on the left side of the operation panel 11. The human sensor unit 16 is arranged at substantially the same height as the operation panel 11 in this example. Since these components are arranged at substantially the same height means, the range covered by the human sensor unit 16 at least partially overlaps with the region typically occupied by a user at the operation panel 11.

The first front cover 22 and the second front cover 23 form a part of the front panel. A front portion of the paper feed cassette 21 also forms a part of the front panel. While all of the paper feed cassettes 21 and the second front cover 23 are closed, the front portions of the first front cover 22, the second front cover 23, and the paper feed cassette 21 are substantially flush with each other, and are extended along a Z-X plane.

The front portion of the sensor cover 24 is substantially flush with the front portions of the first front cover 22, the second front cover 23, and the paper feed cassette 21 when are closed.

Figure 2:
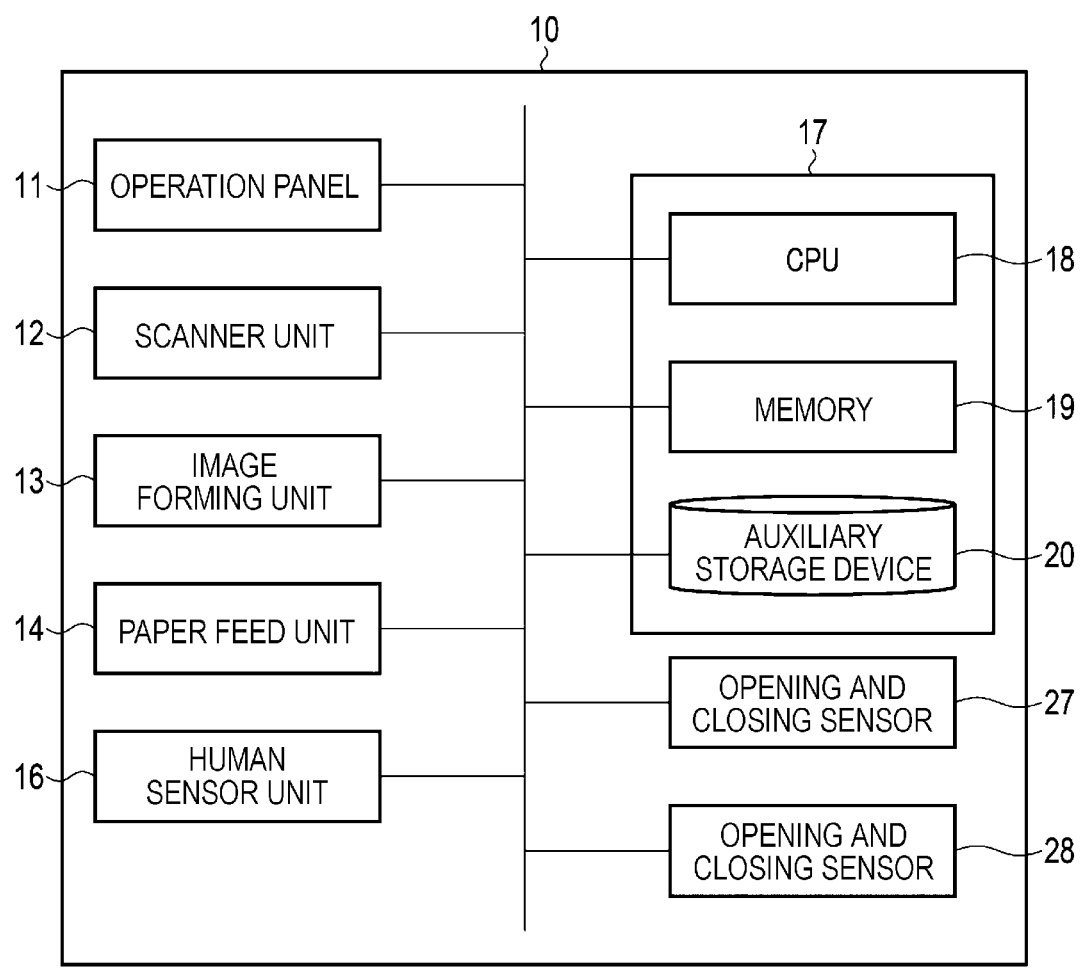
FIG. 2 is a block diagram of an image forming apparatus.

FIG. 2 is a block diagram of the image forming apparatus 10. The image forming apparatus 10 as depicted in FIG. 2 includes the operation panel 11, the scanner unit 12, the image forming unit 13, the paper feed unit 14, the human sensor unit 16, a control unit 17 (a "controller"), an opening and closing sensor 27, and an opening and closing sensor 28.

The opening and closing sensor 27 detects opening and closing of the paper feed cassette 21. The opening and closing sensor 28 detects opening and closing of the second front cover 23. The opening and closing sensors 27 and 28 include push switches (e.g., an actuator switch, a pressure switch, toggle switch), for example. However, the opening and closing sensors 27 and 28 are not limited thereto, and may comprise any well-known sensor types capable of detecting the opening and closing of the relevant element.

The control unit 17 controls the overall operation of the image forming apparatus 10. The control unit 17 includes a Central Processing Unit (CPU) 18, a memory 19, and an auxiliary storage device 20.

The auxiliary storage device 20 stores programs and data necessary for executing various functions of the image forming apparatus 10.

The memory 19 is a main storage device, and includes a Random Access Memory (RAM), or the like. The memory 19 temporarily stores programs and data necessary for the processes being executed by the CPU 18.

The CPU 18 receives information from the operation panel 11 and the human sensor unit 16, reads necessary programs and data from the auxiliary storage device 20 into the memory 19, and executes the programs to control the scanner unit 12, the image forming unit 13, and the paper feed unit 14.

For example, the control unit 17 switches the operation of the image forming apparatus 10 to an operation in power save mode when the image forming apparatus 10 has not been used for a long time, and then switches to an operation in normal mode if the human sensor unit 16 detects a user.

Furthermore, the control unit 17 causes the human sensor unit 16 to start illuminating (become active) when any one of the four paper feed cassettes 21 is detect as opened by the opening and closing sensor 27, and the control unit 17 causes the human sensor unit 16 to stop illuminating (become inactive) when all of the paper feed cassettes 21 are closed.

The control unit 17 also causes the human sensor unit 16 to start illuminating when the second front cover 23 is detected as opened by the opening and closing sensor 27, and the control unit 17 causes the human sensor unit 16 to stop illuminating when the second front cover 23 is closed.

Figure 3:
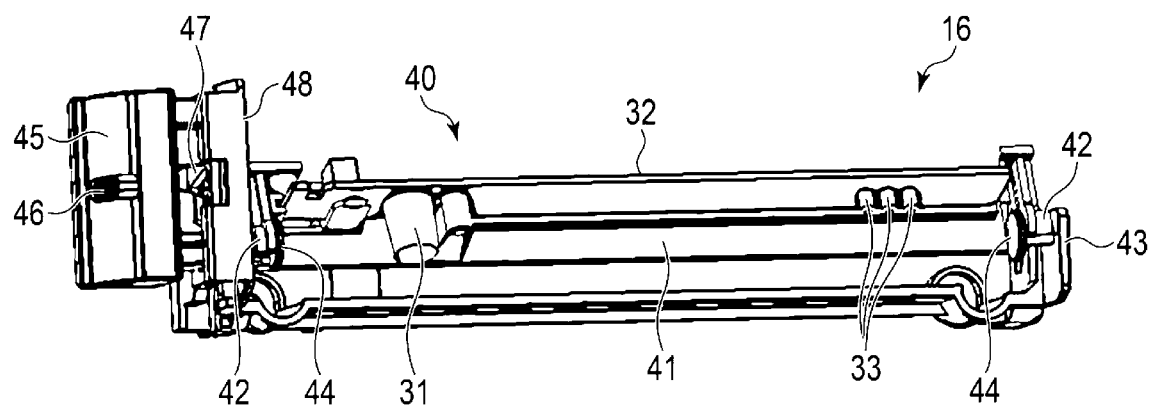
FIG. 3 is a perspective view of a human sensor unit as viewed from the front.
Figure 4:
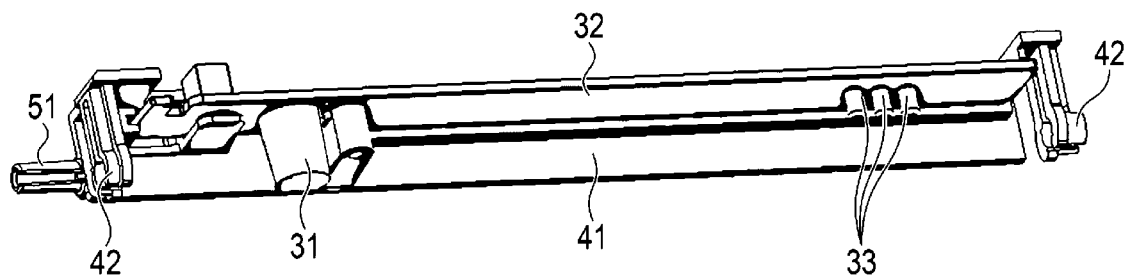
FIG. 4 is a perspective view of a substrate holder as viewed from the front.
Figure 5:
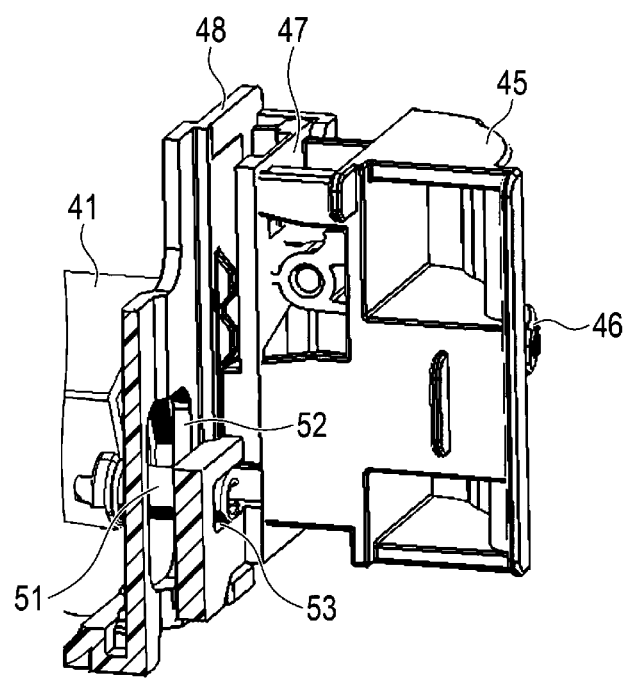
FIG. 5 is a perspective view of a left end of a human sensor unit as viewed from the back.
Figure 6:
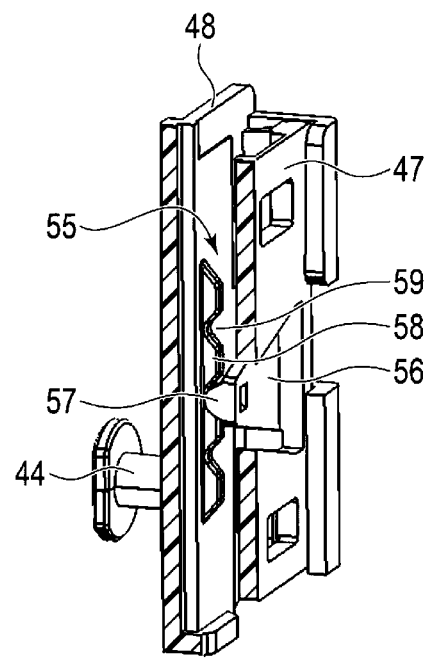
FIG. 6 is a perspective view of a slider and a slider support portion as viewed from the back.

Next, the human sensor unit 16 will be described with reference to FIGS. 3 to 6. FIG. 3 is a perspective view of the human sensor unit 16 as viewed from the front. FIG. 4 is a perspective view of a substrate holder 41 as viewed from the front. FIG. 5 is a perspective view of a left end of the human sensor unit 16 as viewed from the back. FIG. 6 is a perspective view of a slider 47 and a slider support portion 48 as viewed from the back.

The human sensor unit 16 includes a human sensor 31 that detects a user, an illumination light 33 that emits the illuminating light, and an adjustment mechanism 35 (an "adjuster") that changes the detection distance of the human sensor 31 and an illumination direction of the illumination light 33 in conjunction with each other.

The human sensor 31 includes a pyroelectric infrared sensor, for example. The pyroelectric infrared sensor uses the pyroelectric effect of pyroelectric ceramics to detect infrared rays emitted by a user as heat energy. While the human sensor 31 can detect more than human, it will be called the human sensor for convenience.

The illumination light 33 includes three LEDs, for example. The three LEDs are arranged adjacent to each other in a straight line. The number of LEDs included in the illumination light 33 is an example, and without being limited thereto, there may be a different number of LEDs than depicted.

Both the human sensor 31 and the illumination light 33 are mounted on a substrate 32 (e.g., a printed circuit board) on which the necessary wiring and the like are formed. The substrate 32 is an elongated shape, and the human sensor 31 is mounted near the left end of the substrate 32, and the illumination light 33 is mounted near the right end of the substrate 32. Both the human sensor 31 and the illumination light 33 are mounted on the surface of the substrate 32. The three LEDs of the illumination light 33 are aligned along the longitudinal axis of the substrate 32. The wiring of the substrate 32 is electrically connected to the control unit 17. The human sensor 31 supplies a detection signal to the control unit 17. The control unit 17 supplies the electric power necessary for illumination to the illumination light 33 as needed.

The human sensor 31 includes a receiving surface for receiving detection waves. The human sensor 31 detects a user by receiving detection waves from the user present within a predetermined region extending spatially about an axis perpendicular to the receiving surface.

Each LED of the illumination light 33 includes a light emitting surface that emits illuminating light. Each LED illuminates a region extending spatially about the axis perpendicular to the light emitting surface.

In the following description, the direction of the axis perpendicular to the receiving surface of the human sensor 31 is referred to as the detection direction of the human sensor 31. The region in which a person can be detected by the human sensor 31 is referred to as the detection range of the human sensor 31. The detection range of the human sensor 31 spreads out from the receiving surface in a conical shape along the detection direction, for example.

In addition, the direction of the axis perpendicular to the light emitting surface of the LED of the illumination light 33 is referred to as the illumination direction of the illumination light 33. The region that can be illuminated by the illumination light 33 is referred to as the illumination range of the illumination light 33. The illumination range of the illumination light 33 spreads out from the light emitting surface in a conical shape along the illumination direction, for example.

The adjustment mechanism 35 adjusts the detection distance of the human sensor 31 by changing the detection direction of the human sensor 31. The adjustment mechanism 35 also changes the illumination direction of the illumination light 33 to adjust the illumination direction of the illumination light 33. Specifically, the adjustment mechanism 35 supports the human sensor 31 and the illumination light 33 but permits these elements to swing (rotate) about an axis extending to the left and right, and thus changes the directions of the human sensor 31 and the illumination light 33 to adjust the detection distance of the human sensor 31 and the illumination direction of the illumination light 33.

The adjustment mechanism 35 includes the substrate holder 41 that holds the substrate 32 and a frame 43 that supports the substrate holder 41 while permitting the substrate holder 41 to swing/rotate. The frame 43 includes a pair of support axes 44 coaxially provided with each other at the left and right ends. The substrate holder 41 extends to the left and right and beyond the width (horizontal dimension) of the substrate 32, and includes a pair of axis engagement portions 42 to be respectively engaged with the pair of support axes 44 of the frame 43 at the left and right ends. As a result, the substrate holder 41 is swingable on the support axes 44 of the frame 43, and the directions of the human sensor 31 and the illumination light 33 can be altered according to the swing/rotation of the substrate holder 41. That is, the substrate holder 41 and the frame 43 forma swing support mechanism 40 that swingably supports the substrate 32.

The adjustment mechanism 35 includes an operator 45 that can be physically manipulated by the user to adjust the detection distance of the human sensor 31 and the illumination direction of the illumination light 33. The operator 45 is provided at the left end. The operator 45 includes a protrusion 46 such as handle, knob, or the like for ease of operation by the user. The operator 45 is slidable in the up-down direction.

The adjustment mechanism 35 includes the slider 47 to which the operator 45 is fixed. The frame 43 includes the slider support portion 48 at the left end. The slider support portion 48 slidably supports the slider 47 in the up-down direction. The slider 47 and the slider support portion 48 form a support mechanism that permits the operator 45 to slide in the up-down direction.

As illustrated in FIG. 5, the substrate holder 41 includes a cylindrical boss 51 that extends to the left through an opening 52 formed in the slider support portion 48. In some examples, the boss 51 can be a knob-like projection, a pin, such as a hollow pin, or a tube-like member. The slider 47 includes a rectangular hole 53 to receive the left end of the boss 51. Accordingly, as the slider 47 is slid in the up-down direction, the boss 51 is moved in the up-down direction. As a result, the substrate holder 41 is swung on the support axes 44 of the frame 43 which are engaged with the axis engagement portions 42 at both left and right ends thereof. As a result, the directions of the human sensor 31 and the illumination light 33 are changed. That is, the cylindrical boss 51 of the substrate holder 41 and the rectangular hole 53 of the slider 47 configure a conversion mechanism that converts up-and-down movement of the slider 47 into a swing of the substrate holder 41 holding the substrate 32. The conversion mechanism converts the sliding by the operator 45 into a change in the direction of the human sensor 31 and the illumination light 33.

The operator 45 can be positioned at a plurality of positions. Therefore, as can be seen more clearly in FIG. 6, the slider 47 includes an elastically deformable cantilever lever 56. The cantilever lever 56 includes a claw 57 protruding to the right at its free end. The slider support portion 48 includes a claw receiver 58 including a plurality of recesses 59 for receiving the claw 57 therein.

The claw 57 of the cantilever lever 56 moves on the claw receiver 58 of the slider support portion 48 as the slider 47 is slid up and down. When the claw 57 is positioned between the recess 59 and the recess 59, the cantilever lever 56 is elastically deformed. If the claw 57 is positioned in one of the recesses 59, the cantilever lever 56 is restored to its undeformed state. The claw 57 is engaged with the recess 59 while being urged by the restoring force of the cantilever lever 56. As a result, the movement of the claw 57 of the cantilever lever 56 is restricted. As a result, the operator 45 is positioned in a controlled manner. That is, the cantilever lever 56 of the slider 47 and the claw receiver 58 of the slider support portion 48 configure a positioning mechanism 55 that positions the operator 45 at a plurality of different set positions.

When the operator 45 is pressed or otherwise manipulated with only small force that is insufficient to disengage the claw 57 and the recess 59 against the restoring force of the cantilever lever 56, the positioning mechanism 55 maintains the engagement between the claw 57 and the recess 59 and this hinders the sliding of the operator 45, and keeps the operator 45 in its position in the face of small forces.

When the operator 45 is pressed or otherwise manipulated with a force sufficiently large enough to disengage the claw 57 and the recess 59 against the restoring force of the cantilever lever 56, the positioning mechanism 55 allows the operator 45 to slide to another position.

The claw receiver 58 includes three recesses 59. Accordingly, the operator 45 can be positioned in three stages. If the claw 57 is engaged with the upper recess 59, the human sensor unit 16 is adjusted so the detection distance of the human sensor 31 is a close distance. If the claw 57 is engaged with the middle recess 59, the human sensor unit 16 is adjusted so the detection distance of the human sensor 31 is a normal distance. If the claw 57 is engaged with the lower recess 59, the human sensor unit 16 is adjusted so the detection distance of the human sensor 31 is a long distance.

The number of recesses 59 included in the claw receiver 58 is an example, and without being limited thereto, there may be any suitable number of recesses.

Figure 7:
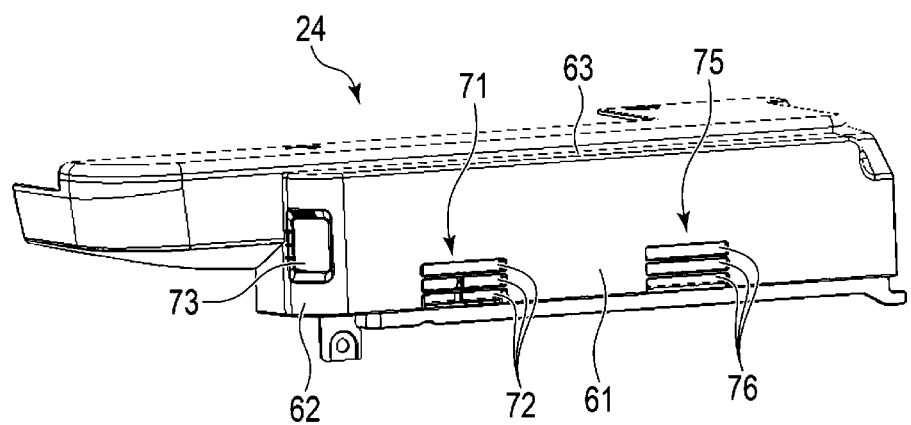
FIG. 7 is an enlarged view of a sensor cover.

Next, the sensor cover 24 will be described with reference to FIG. 7. FIG. 7 is a perspective view of the sensor cover 24. The sensor cover 24 is an exterior cover that covers the human sensor unit 16. The human sensor unit 16 is arranged within the height range of the sensor cover 24.

The sensor cover 24 is arranged at the front and left position of the image forming apparatus 10. In order to define a space for accommodating the human sensor unit 16, the sensor cover 24 includes a front portion 61 facing forward, a rear extension 62 extending rearward from a left end of the front portion 61, and an upper surface portion 63 extending horizontally from upper ends of the front portion 61 and the rear extension 62.

The sensor cover 24 includes a detection window 71 that allows the detection waves (for example, infrared rays) for the human sensor 31 to pass through, an opening 73 that allows the operator 45 of the adjustment mechanism 35 to be exposed, and an illumination window 75 that allows the illuminating light of the illumination light 33 to pass through. The detection window 71, the opening 73, and the illumination window 75 are formed commonly on the sensor cover 24 in this example so as to be manufactured at low cost.

The detection window 71 is formed on the left side of the center of the front portion 61 in the left-right direction. The detection window 71 is formed below the center of the front portion 61 in the up-down direction. The detection window 71 includes three slits 72 extending in the width direction. Each slit 72 includes a height dimension that is restricted to prevent the entry of a finger, a pen, or the like. As a result, the human sensor 31 is prevented from being inadvertently damaged. The number of slits 72 in the detection window 71 is an example, and without being limited thereto, there may be any number of slits.

The opening 73 is formed in the rear extension 62. The rear extension 62 is curved outward. The rear extension 62 forms a curved corner on the front and left sides of the image forming apparatus 10. The opening 73 includes a height corresponding to the amount of up and down sliding of the operator 45. That is, the height dimension of the opening 73 is greater than the sum of the height of the protrusion 46 and the amount of up and down sliding of the operator 45. The opening 73 has a greater lateral dimension along an outer surface of the rear extension 62 than the protrusion 46 of the operator 45.

The illumination window 75 is formed near the center of the front portion 61 in the left-right direction. The illumination window 75 is below the center of the front portion 61 in the up-down direction. The illumination window 75 includes three slits 76 extending in the width direction. Each slit 76 includes a height dimension that is restricted to prevent the entry of a finger, a pen, and the like. As a result, the illumination light 33 is prevented from being inadvertently damaged. The number of slits 76 in the illumination window 75 is an example, and without being limited thereto, there may be any number slits.

The human sensor unit 16 is arranged in a space having three sides defined by the front portion 61, the rear extension 62, and the upper surface portion 63 of the sensor cover 24. That is, the human sensor unit 16 is arranged behind the front portion 61 of the sensor cover 24.

As illustrated in FIG. 1, the sensor cover 24 is arranged on the left side of the operation panel 11. The human sensor unit 16 is also arranged on the left side of the operation panel 11. That is, the human sensor 31, the illumination light 33, and the adjustment mechanism 35 are arranged on the left side of the operation panel 11. The human sensor unit 16 is arranged at substantially the same height as the operation panel 11. That is, the human sensor 31, the illumination light 33, and the adjustment mechanism 35 are arranged at substantially the same height as the operation panel 11.

The human sensor 31 and the illumination light(s) 33 are arranged behind the detection window 71 and the illumination window 75, respectively. The illumination lights 33 are arranged between the operation panel 11 and the human sensor 31. The human sensor 31 is between the illumination lights 33 and the operator 45. The operator 45 is exposed through the opening 73 of the rear extension 62.

Figure 8:
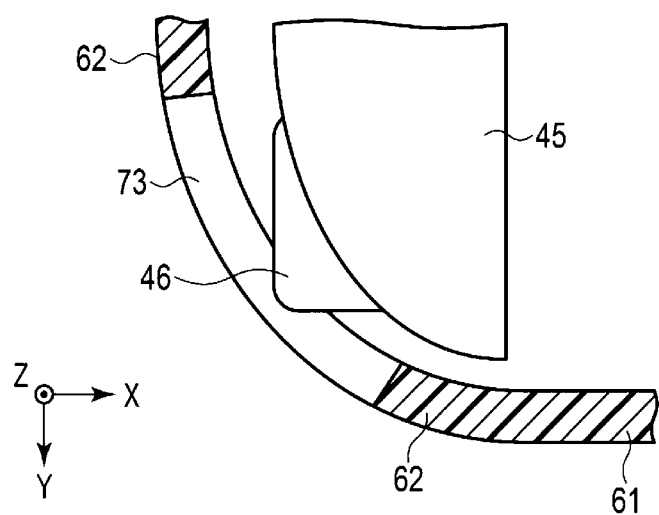
FIG. 8 is a partial, horizontal cross-sectional view of a sensor cover and an operator.

FIG. 8 is a partial, horizontal cross-sectional view of the operator 45 and the sensor cover 24, illustrating the state when the human sensor unit 16 is covered by the sensor cover 24, that is, in the state illustrated in FIG. 1. As can be seen from FIGS. 1 and 8, the operator 45 of the human sensor unit 16 is arranged so as to be visible from both the front and the side through the opening 73 of the rear extension 62.

However, as illustrated in FIG. 8, the operator 45 does not protrude from the sensor cover 24. That is, the operator 45, including the protrusion 46, is arranged inside, that is, arranged rearward or to the right side of the outer surface of the rear extension 62.

Figure 9:
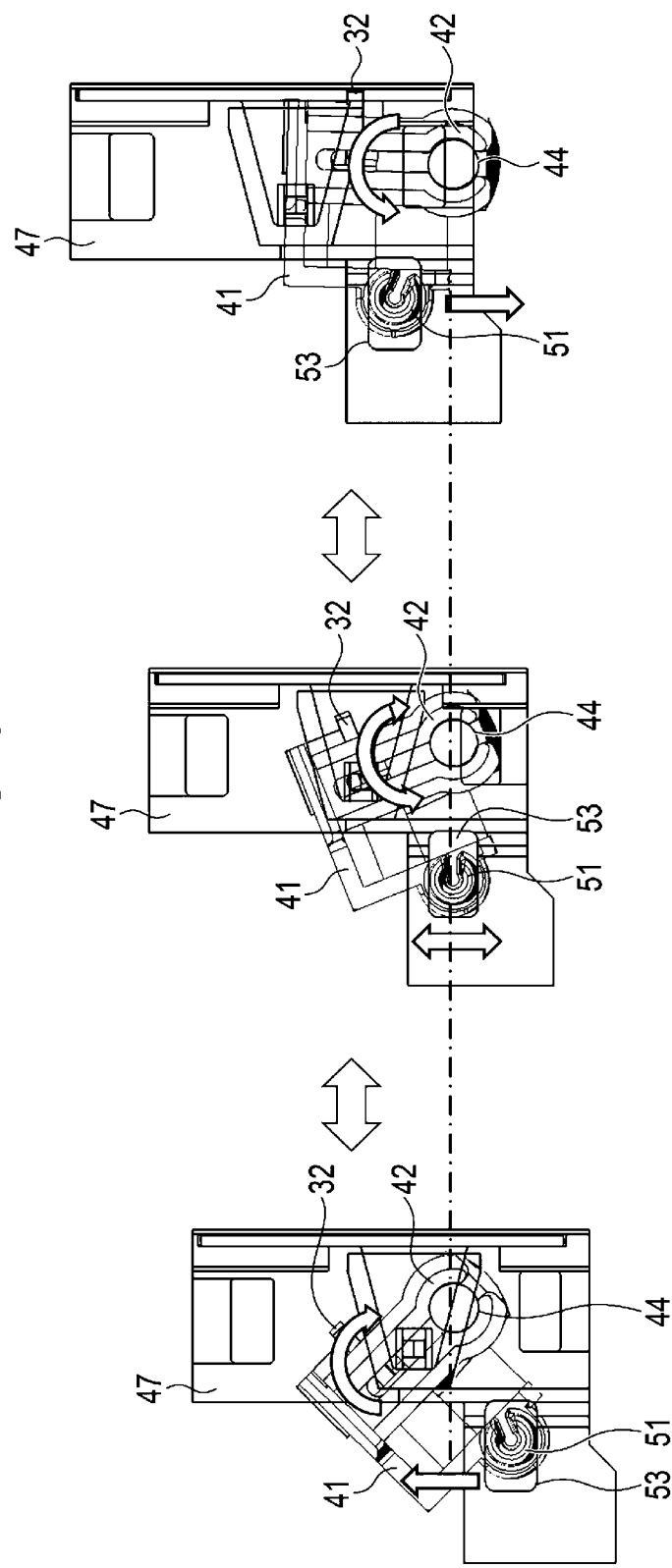
FIG. 9 is a side view of a slider and a substrate holder illustrating the states when a detection distance of a human sensor is adjusted to a close distance, a normal distance, and a long distance.

The adjustment of the detection distance of the human sensor 31 in the human sensor unit 16 will be described with reference to FIGS. 9 to 11. FIG. 9 is a side view of the slider 47 and the substrate holder 41, FIG. 10 is a side view of the human sensor 31, and FIG. 11 is a side view of the image forming apparatus 10, illustrating states with the detection distance of the human sensor 31 adjusted to a close distance, a normal distance, and a long distance.

Figure 10:
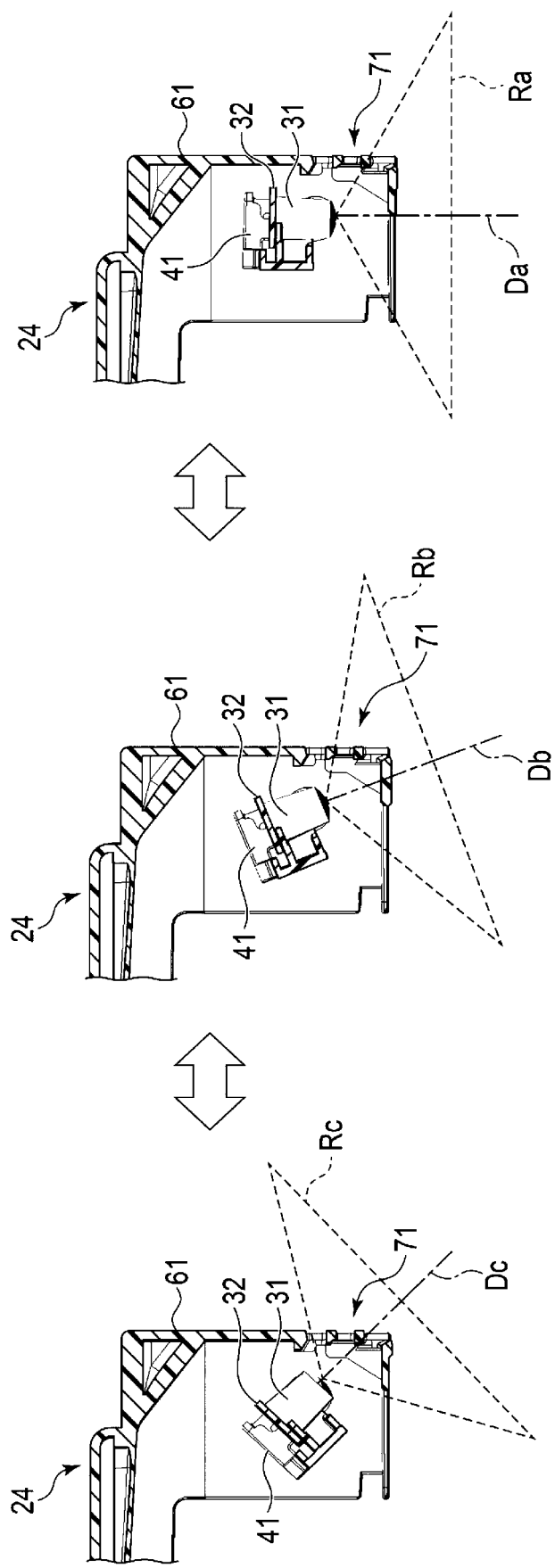
FIG. 10 is a side view of a human sensor illustrating the states when the detection distance of the human sensor is adjusted to a close distance, a normal distance, and a long distance.
Figure 11:
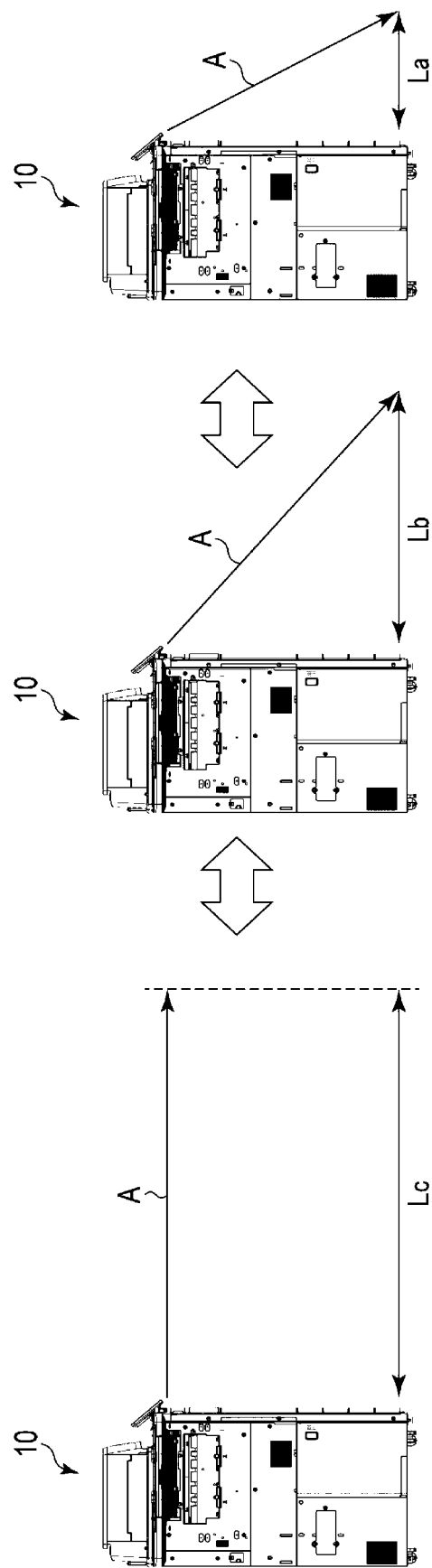
FIG. 11 is a side view of an image forming apparatus illustrating the states when the detection distance of the human sensor is adjusted to a close distance, a normal distance, and a long distance.

In FIGS. 9 to 11, the close distance state is illustrated on the right, the normal distance state is illustrated in the center, and the long distance state is illustrated on the left.

When the detection distance is adjusted to the close distance state, as illustrated on the right side of FIG. 9, the operator 45 and the slider 47 are positioned on the uppermost one of the three stages, the claw 57 is engaged with the uppermost recess 59 (see FIG. 6), and the substrate 32 is horizontal. Therefore, as illustrated on the right side of FIG. 10, a detection direction Da of the human sensor 31 faces downward, and a detection range Ra of the human sensor 31 spreads out in a conical shape along the downward detection direction Da.

The human sensor 31 can detect people within the detection range Ra that spreads out through the detection window 71 of the sensor cover 24. As a result, as illustrated on the right side of FIG. 11, the detection distance of the human sensor 31 is the close distance La. In FIG. 11, arrow A represents a boundary of the range that can be detected by the human sensor 31 through the detection window 71.

When the slider 47 is slid downward, shifting from the state illustrated on the right side of FIG. 9 to the state illustrated in the center, the boss 51 of the substrate holder 41 engaged with the rectangular hole 53 of the slider 47 is moved downward. Accordingly, the substrate holder 41 is rotated counterclockwise about the support axis 44 of the frame 43 which is engaged with the axis engagement portion 42 of the substrate holder 41. As a result, the detection direction of the human sensor 31 is rotated from the bottom towards the front.

When the claw 57 of the cantilever lever 56 of the slider 47 is engaged with the middle recess 59 (see FIG. 6), as illustrated in the center of FIG. 9, the operator 45 and the slider 47 are positioned at the center one of the three stages, and the detection distance is adjusted to the normal distance state. In this state, as illustrated in the center of FIG. 10, a detection direction Db of the human sensor 31 still faces downward but less steeply than in the close distance state, and a detection range Rb of the human sensor 31 spreads out in a conical shape along the detection direction Db.

The human sensor 31 can detect people within the detection range Rb that spreads out through the detection window 71 of the sensor cover 24. As a result, as illustrated in the center of FIG. 11, the detection distance of the human sensor 31 is a normal distance Lb.

When the slider 47 is slid downward so as to shift from the state illustrated in the center to the state illustrated on the left side of FIG. 9, the boss 51 of the substrate holder 41 is moved downward by the slider 47 and the substrate holder 41 is rotated counterclockwise about the support axis 44 of the frame 43, and the detection direction of the human sensor 31 is further rotated in the upward direction.

When the claw 57 of the cantilever lever 56 of the slider 47 is engaged with the lowermost recess 59 (see FIG. 6), as illustrated on the left side of FIG. 9, the operator 45 and the slider 47 are positioned at the lower one of the three stages, and the detection distance is adjusted to be a long distance. In this state, as illustrated on the left side of FIG. 10, a detection direction Dc of the human sensor 31 faces at less of downward angle than the detection direction Db, and a detection range Rc spreads out in a conical shape along the detection direction Dc. The detection direction Dc may be substantially parallel to the XY plane. That is, the detection direction DC may be horizontal.

The human sensor 31 can detect people within the detection range Rc that spreads out through the detection window 71 of the sensor cover 24. As a result, as illustrated on the left side of FIG. 11, the detection distance of the human sensor 31 is a long distance Lc.

The operation of sliding the operator 45 downward from the upper position has been described above, and the operation of sliding the operator 45 upward from a lower position can be easily inferred from the above description.

Next, the illumination by an illumination light 33 in the human sensor unit 16 will be described with reference to FIGS. 12 to 17.

Figure 12:
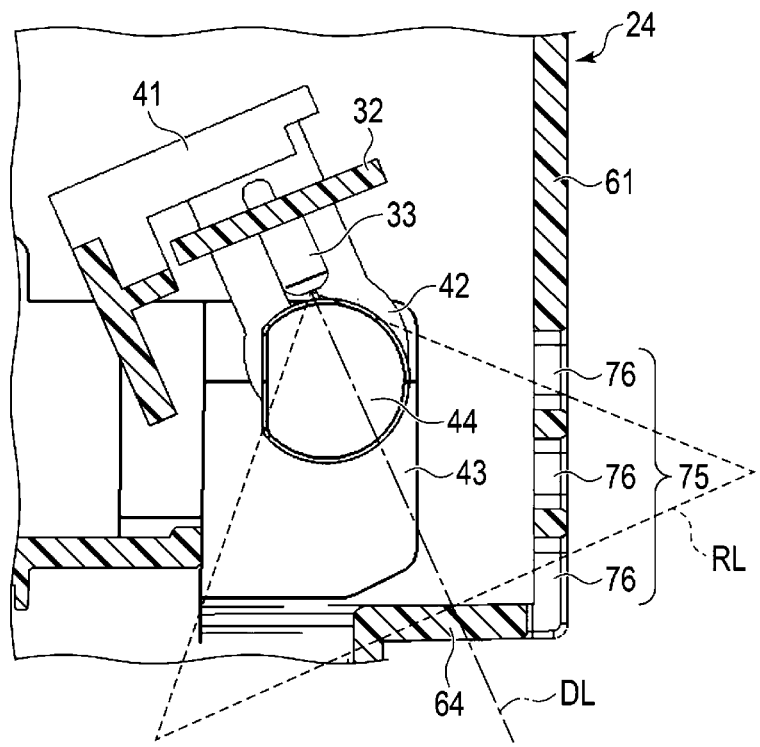
FIG. 12 is a side view of an illumination light illustrating the state when the detection distance of the human sensor is adjusted to a normal distance.

FIG. 12 is a side view of the illumination light 33 illustrating the state when the detection distance of the human sensor 31 is a normal distance. In this state, since the human sensor 31 and the illumination light 33 are mounted vertically on the same surface of the substrate 32, the illumination direction DL of the illumination light 33 is parallel to the detection direction Db of the human sensor 31 as illustrated in the center of FIG. 10. The illumination range RL of the illumination light 33 spreads out from the light emitting surface in a conical shape along the illumination direction DL.

The range in front of the image forming apparatus 10 that can be illuminated by the illumination light 33 is a portion of the illumination range RL after the illumination light 33 passes through the illumination window 75 of the sensor cover 24. In other words, the actual illumination range is a range irradiated with an illuminating light that has passed through the slit 76 of the illumination window 75.

The illumination light 33 is controlled by the control unit 17 to be on if the paper feed cassette 21 or the second front cover 23 is open. The illumination light 33 is controlled by the control unit 17 to be off if the paper feed cassettes 21 and the second front cover 23 are all closed.

The lowermost slit 76 of the illumination window 75 is open downward such that the light emitted from the illumination light 33 can effectively illuminate the rear portions of the paper feed cassette 21, the first front cover 22, and the second front cover 23. That is, the lowermost slit 76 of the illumination window 75 is formed at the lower end of the front portion 61 of the sensor cover 24.

Figure 13:
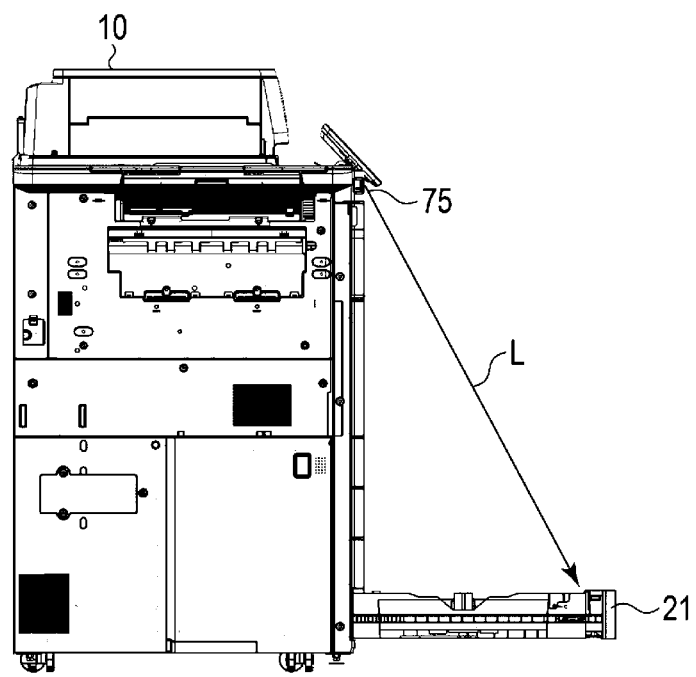
FIG. 13 is a side view of an image forming apparatus illustrating the state when an open lowermost paper feed cassette is illuminated.
Figure 14:
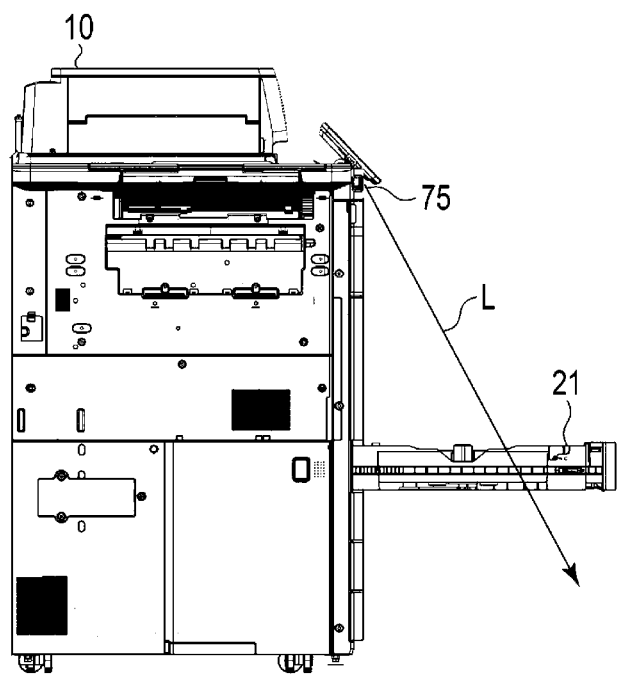
FIG. 14 is a side view of an image forming apparatus illustrating the state when an open uppermost paper feed cassette is illuminated.
Figure 15:
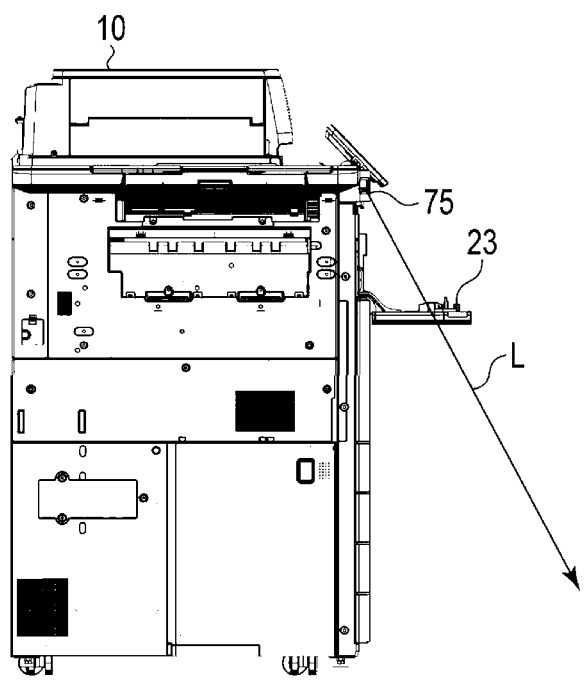
FIG. 15 is a side view of an image forming apparatus illustrating the state when an open second front cover is illuminated.

FIG. 13 is a side view of the image forming apparatus 10 illustrating the state when the open lowermost paper feed cassette 21 is being illuminated. FIG. 14 is a side view of the image forming apparatus 10 illustrating the state when the open uppermost paper feed cassette 21 being illuminated. FIG. 15 is a side view of the image forming apparatus illustrating the state when the open second front cover 23 is being illuminated.

FIGS. 13, 14 and 15 illustrate the lowermost paper feed cassette 21, the uppermost paper feed cassette 21, and the second front cover 23 being illuminated by light L passed through the illumination window 75, respectively. In these drawings, the depicted ray (arrow) for light L represents t the farthest illumination distance.

Figure 16:
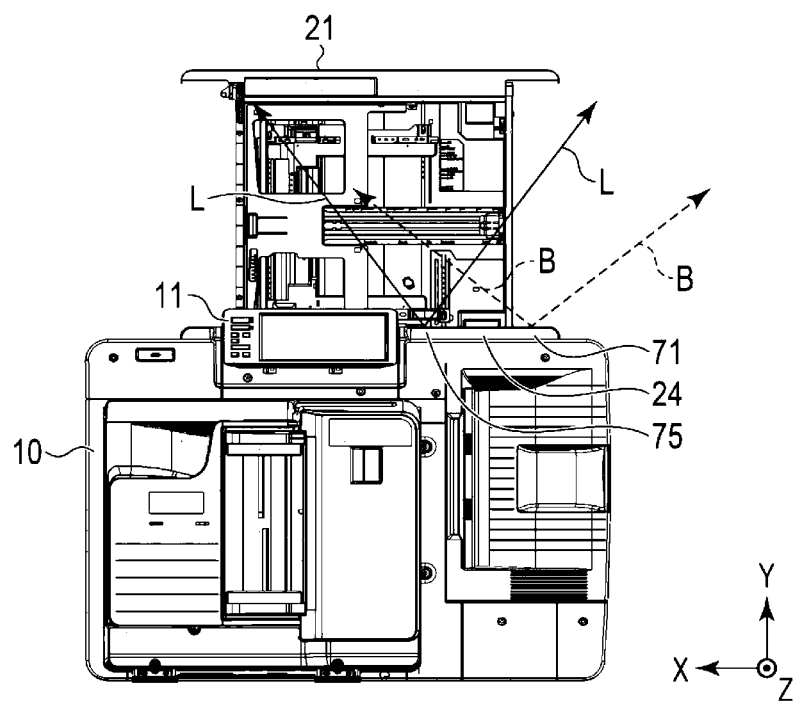
FIG. 16 is a top view of an image forming apparatus illustrating the state when an open paper feed cassette is illuminated.
Figure 17:
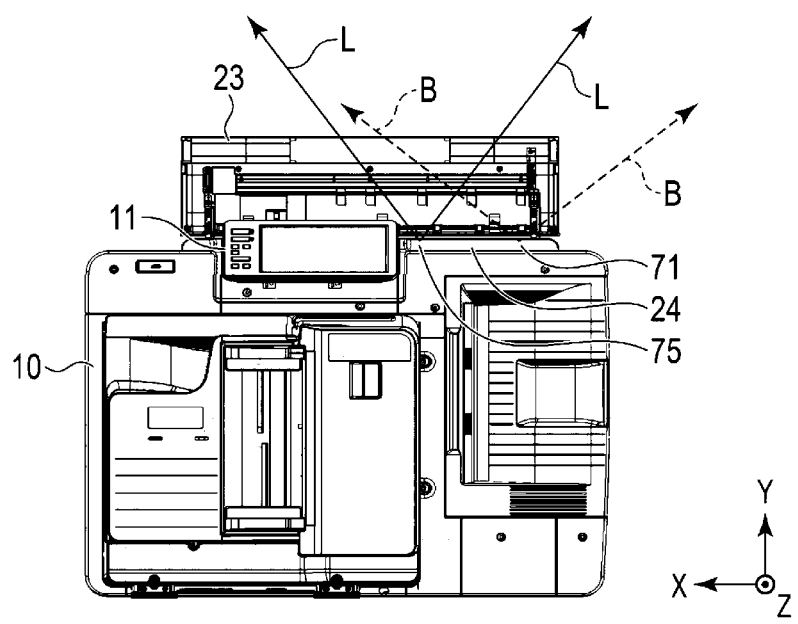
FIG. 17 is a top view of an image forming apparatus illustrating the state when the open second front cover is illuminated.

FIG. 16 is a top view of the image forming apparatus 10 illustrating the state when the open paper feed cassette 21 is being illuminated. FIG. 17 is a top view of the image forming apparatus 10 illustrating the state when the open second front cover 23 is being illuminated.

As illustrated in FIGS. 16 and 17, the illumination window 75 is arranged near the operation panel 11 in the left-right direction. In other words, the illumination window 75 is arranged near the center of the image forming apparatus 10 in the left-right direction. Therefore, the light L that passes through the illumination window 75 and is emitted to the front direction of the image forming apparatus 10 and illuminates the paper feed cassette 21 or the second front cover 23, which are arranged near the center of the image forming apparatus 10 in the left-right direction.

The detection window 71 is arranged farther from the operation panel 11 than the illumination window 75 in the left-right direction. In other words, the detection window 71 is arranged near an end of the image forming apparatus 10 in the left-right direction. The human sensor 31 can detect a user through the detection window 71 over a relatively wide range in the left-right direction, as indicated by a pair of arrows B. Here, the arrows B represent boundaries of the range covered by the human sensor 31 through the detection window 71. Therefore, the human sensor 31 is in the position that does not hinder with the detection of a user.

The illumination by the light 33 has been described above by referring to the detection distance of the human sensor 31 at the normal distance state, but the paper feed cassette 21 and the second front cover 23 can be satisfactorily illuminated by the light emitted from the illumination light 33 and passed through the illumination window 75 even if the detection distance of the human sensor 31 is the close distance or the long distance state.

Furthermore, when the detection distance of the human sensor 31 is set to the long distance state, since the illuminating light reaches a long distance, another person who is far away can see that the user of the image forming apparatus 10 is opening the paper feed cassette 21 or the second front cover 23.

Hereinafter, a human sensor unit 16 according to a modified example will be described with reference to FIGS. 18 to 20. The human sensor unit 16 according to the modified example can replace the human sensor unit 16 described above with reference to FIGS. 3 to 6.

Figure 18:
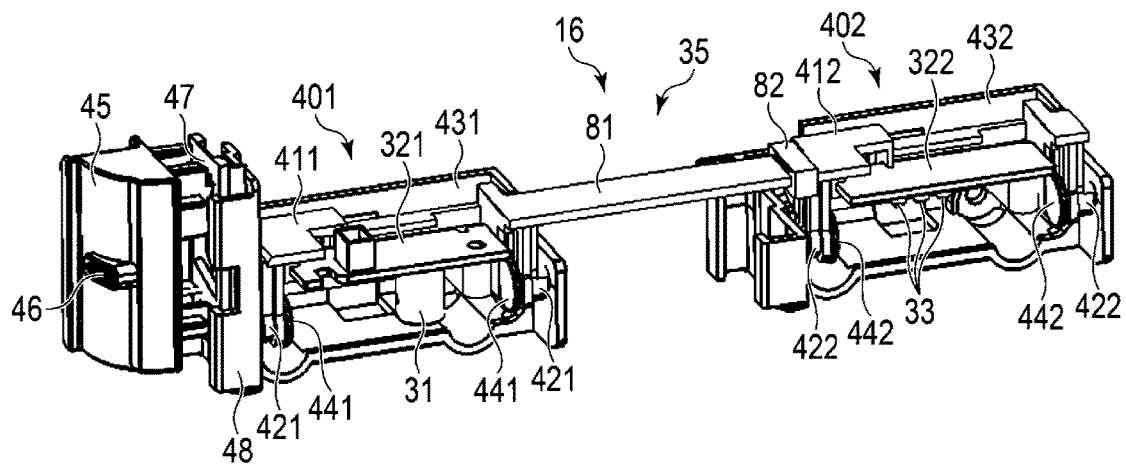
FIG. 18 is a perspective view of a human sensor unit according to a modified example as viewed from the front.

FIG. 18 is a perspective view of the human sensor unit 16 according to the modified example as viewed from the front. FIG. 19 is an exploded perspective view of the human sensor unit 16 according to the modified example. FIG. 20 is a perspective view of the human sensor unit 16 according to the modified example as viewed from the front. In these drawings, members having the same reference numerals used in FIGS. 3 to 6 indicate like or substantially similar members unless otherwise noted, and detailed description of such repeated aspects will be omitted. The differences will be explained.

Figure 19:
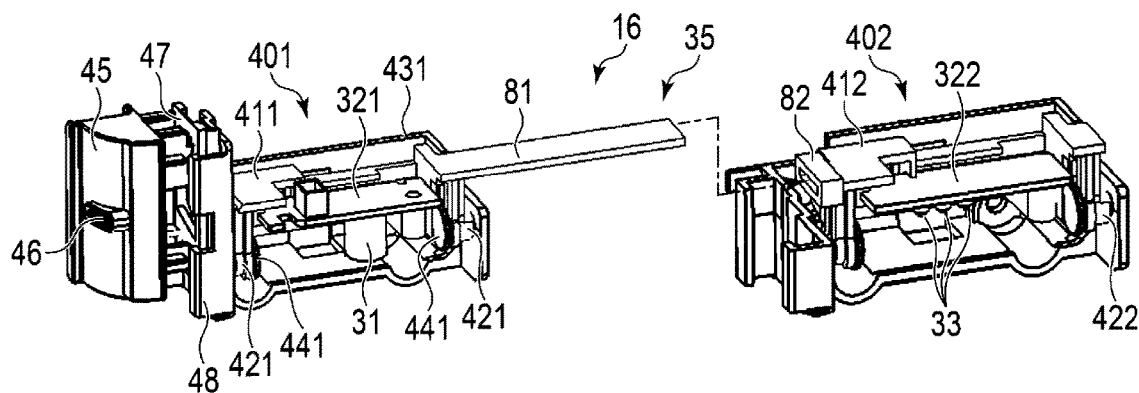
FIG. 19 is an exploded perspective view of a human sensor unit according to a modified example.

FIGS. 18 and 19 illustrate the human sensor unit 16 with the detection distance adjusted to a close distance state. FIG. 20 illustrates the human sensor unit 16 with the detection distance adjusted to a long distance state.

Figure 20:
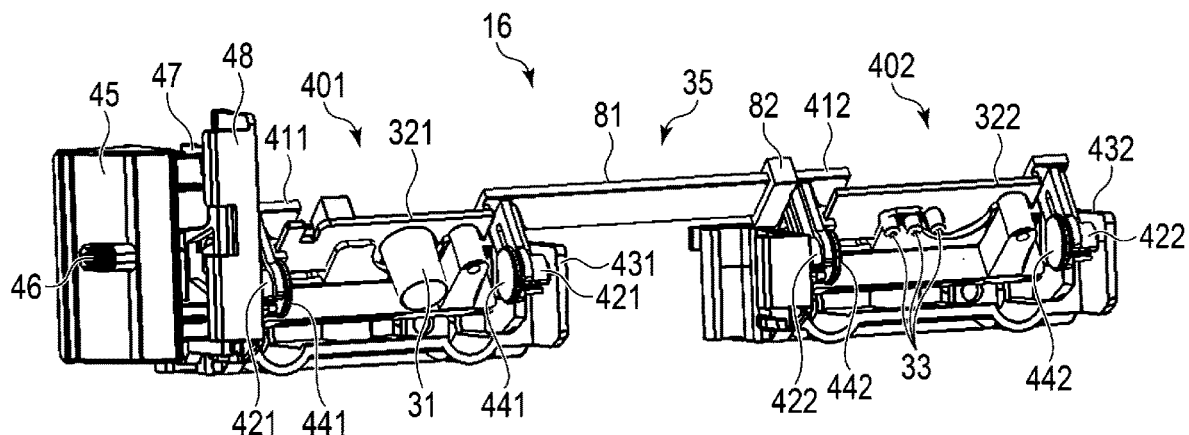
FIG. 20 is a perspective view of a human sensor unit according to a modified example as viewed from the front.

As illustrated in FIGS. 18 to 20, the adjustment mechanism 35 of the human sensor unit 16 according to the modified example includes a swing support mechanism 401 (first swing support mechanism) that supports a substrate 321 (first substrate) on which the human sensor 31 is mounted, and a swing support mechanism 402 (second swing support mechanism) that supports a substrate 322 (second substrate) on which the illumination light 33 is mounted. The swing support mechanism 401 permits the substrate 321 to swing/rotate. Similarly, the swing support mechanism 402 permits the substrate 322 to swing/rotate.

The swing support mechanism 401 includes a substrate holder 411 that holds the substrate 321 and a frame 431 that supports the substrate holder 411, but permits the substrate holder to swing/rotate. The frame 431 includes a pair of support axes 441 coaxially provided at the left and right ends. The substrate holder 411 includes a pair of axis engagement portions 421 respectively engaged with the pair of support axes 441 at the left and right ends. As a result, the substrate holder 411 is swingable about the support axes 441, and the direction of the human sensor 31 can be changed according to the swing of the substrate holder 411.

At the left end of the frame 431, the slider 47 and the slider support portion 48 are provided to form a support mechanism that slidably supports the operator 45 in the up-down direction.

The swing support mechanism 402 includes a substrate holder 412 that holds the substrate 322 and a frame 432 that supports the substrate holder 412, but permits the substrate holder to swing/rotate. The frame 432 includes a pair of support axes 442 coaxially provided at the left and right ends. The substrate holder 412 includes a pair of axis engagement portions 422 respectively engaged with the pair of support axes 442 at the left and right ends. As a result, the substrate holder 412 is swingable about a support axis 442, and the direction of the illumination light 33 can be changed according to the swing of the substrate holder 412.

The substrate holder 411 includes an elongated arm 81 extending from the right end to the right. The substrate holder 412 includes an arm receiver 82 at the left end into which the arm 81 can be inserted. When the arm 81 is inserted into the arm receiver 82, the swing support mechanism. 401 and the swing support mechanism 402 are mechanically connected. The arm 81 and the arm receiver 82 form a transmission mechanism or linkage for transmitting the movement of the substrate 321 to the substrate 322.

Although not specifically illustrated in FIGS. 18 to 20, the substrate holder 411 of the swing support mechanism 401 includes a cylindrical boss 51 extending to the left, like the substrate holder 41 described with reference to FIG. 5. The slider 47 includes the rectangular hole 53 that receives the left end of the boss 51. The cylindrical boss 51 of the substrate holder 411 and the rectangular hole 53 of the slider 47 form a conversion mechanism that converts the up-and-down movement of the slider 47 into a swing/rotation of the substrate holder 411.

The movement of the substrate 321 due to the swing of the substrate holder 411 is transmitted to the substrate 322 by the arm 81 connected to the arm receiver 82. As a result, the illumination direction of the illumination light 33 can be adjusted in conjunction with the adjustment of the detection distance of the human sensor 31.

The image forming apparatus 10 includes a human sensor unit 16 having an illumination function in addition to a human detection function. The human sensor unit 16 can adjust the detection distance of the human sensor 31, and also adjust the illumination direction of the illumination light 33 in conjunction with the adjustment of the detection distance of the human sensor 31.

The image forming apparatus 10 also includes the opening and closing sensor 27 that detects the opening and closing of the paper feed cassette 21, the opening and closing sensor 28 that detects the opening and closing of the second front cover 23, and the control unit 17 that controls turning on and off of the illumination light 33 based on output from the opening and closing sensors 27 and 28. The control unit 17 turns on the illumination light 33 at least when the paper feed cassette 21 or the second front cover 23 is open. The control unit 17 turns off the illumination light 33 when the paper feed cassettes 21 and the second front cover 23 are all closed.

The human sensor unit 16 is arranged on the side of the operation panel 11 at substantially the same height as the operation panel 11. Therefore, the operator 45 is arranged at a height where it is easy to operate. As a result, the user can easily manipulate the operator 45 without significantly changing posture.

The illumination light 33 is positioned between the operation panel 11 and the human sensor 31. The human sensor 31 is positioned between the illumination light 33 and the operator 45. Therefore, the illumination light 33 is near the center of the image forming apparatus 10 in the left-right direction. As a result, the illumination light 33 more effectively illuminates the paper feed cassette 21 and the second front cover 23 which are near the center of the image forming apparatus 10 in the left-right direction.

The operator 45 is exposed through the opening 73 of the sensor cover 24 so as to be visible from both the front and side directions. Therefore, the operator 45 is easily noticeable and also easily accessible.

The operator 45 is slidable in the up-down direction. Accordingly, the detection distance of the human sensor 31 can be adjusted by a simple, intuitive operation. Furthermore, the currently set state for the detection distance of the human sensor 31 can be visually confirmed based on the up-down position of the protrusion 46.

The operator 45 can be positioned at a plurality of fixed positions. By the disclosed mechanism above, it is possible to prevent the operator 45 from being moved to a new position by a slight or inadvertent contact with the operator 45 resulting in undesirable changes in the detection distance of the human sensor 31.

In the described embodiment, the operator 45 is slidable in the up-down direction, but the present disclosure is not limited thereto. The operator 45 may instead be any setting structure type such as a rotary dial or the like. Preferably, such a rotary dial would be marked such that the detection distance of the human sensor 31 can be seen.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
    a housing;
    a first sensor configured to detect a user in front of the housing;
    an illumination light configured to emit light in an illumination direction;
    an opening and closing element configured to open and close a portion of the housing;
    a second sensor configured to detect the opening and closing of the opening and closing element;
    an adjuster configured to change a detection distance of the first sensor and the illumination direction of the illumination light in conjunction with each other by movement of the first sensor and the illumination light; and
    a controller configured to:
        turn on the illumination light when the opening and closing element is detected as open by the second sensor, and
        turn off the illumination light when the opening and closing element is detected as closed by the second sensor, wherein
    the adjuster includes:
        a slidable operator that can be moved by a user to adjust the detection distance and the illumination direction,
        a first substrate on which the first sensor is mounted;
        a first swing support that supports the first substrate and permits the first substrate to rotate about an axis of the first swing support;
        a second substrate on which the illumination light is mounted;
        a second swing support that supports the second substrate and permits the second substrate to rotate about an axis of the second swing support; and
        a linkage that transmits a movement of the first substrate to the second substrate, and
    the first substrate rotates about the axis when the slidable operator is moved in an up-down direction.

2. The image forming apparatus according to claim 1, further comprising:
    an operation panel configured to receive operation instructions from a user in front of the housing, wherein
    the first sensor, the illumination light, and the adjuster are positioned to one side of the operation panel in a lateral direction of the housing.

3. The image forming apparatus according to claim 2, wherein the first sensor, the illumination light, and the adjuster are positioned at substantially a same height as the operation panel in a vertical direction of the housing.

4. The image forming apparatus according to claim 2, further comprising:
    a sensor cover covering the first sensor, the illumination light, and the adjuster, wherein
    the first sensor, the illumination light, and the adjuster are positioned at as same a height as the sensor cover in the vertical direction.

5. The image forming apparatus according to claim 4, wherein
    the sensor cover includes a detection window through which a detection wave from the first sensor passes, an illumination window through which the light from the illumination light passes, and an opening exposing the slidable operator.

6. The image forming apparatus according to claim 5, wherein
    the illumination light is between the operation panel and the first sensor in the lateral direction,
    the first sensor is between the illumination light and the slidable operator, and
    the slidable operator includes a protrusion that extends through the opening.

7. The image forming apparatus according to claim 5, wherein
the adjuster converts a movement of the slidable operator into a change in the illumination direction of the illumination light and a sensing direction of the first sensor.

8. The image forming apparatus according to claim 7, wherein the slidable operator has a plurality of fixed positions each corresponding to a different illumination direction and sensing direction.

9. The image forming apparatus according to claim 1, wherein
the opening and closing element is a paper storage cassette, and
the illumination direction of the illumination light intersects the paper storage cassette when the paper storage cassette is in an open position.

10. The image forming apparatus according to claim 1, wherein the first sensor is a pyroelectric infrared sensor.

11. The image forming apparatus according to claim 1, wherein the controller is configured to change an operating state of the image forming apparatus from an idle state to a normal state when the first sensor detects the user in front of the housing.

12. A multifunctional peripheral apparatus, comprising:
a paper feed unit including at least one paper cassette that can be opened and closed;
an image forming unit above the paper feed unit in a vertical direction, the image forming unit including at least one outer panel that can be opened and closed;
a first sensor configured to detect a user in front of the image forming unit;
an illumination light configured to emit light in an illumination direction;
a second sensor configured to detect the opening and closing of the at least one paper cassette;
a third sensor configured to detect the opening and closing of the at least one outer panel;
an adjuster including a slidable operator, the adjuster configured to change a detection distance of the first sensor and the illumination direction of the illumination light in conjunction with each other by physical movement of the first sensor and the illumination light when the slidable operator is moved by a user; and
a controller configured to:
turn on the illumination light when the at least one paper cassette is detected as open by the second sensor, and
turn off the illumination light when the at least one paper cassette is detected as closed by the second sensor, wherein
the adjuster further comprises:
a first substrate on which the first sensor is mounted;
a first swing support that supports the first substrate and permits the first substrate to rotate about an axis of the first swing support;
a second substrate on which the illumination light is mounted;
a second swing support that supports the second substrate and permits the second substrate to rotate about an axis of the second swing support; and
a linkage that transmits a movement of the first substrate to the second substrate, and
the first substrate rotates about the axis when the slidable operator is moved in an up-down direction.

13. The multifunctional peripheral apparatus according to claim 12, wherein the slidable operator has a plurality of fixed positions each corresponding to a different illumination direction and sensing direction.

14. The multifunctional peripheral apparatus according to claim 12, wherein
the adjuster converts a movement of the slidable operator into a change in the illumination direction of the illumination light and a sensing direction of the first sensor.

15. The multifunctional peripheral apparatus according to claim 12, further comprising:
an operation panel configured to receive operation instructions from a user in front of the image forming unit, wherein
the first sensor, the illumination light, and the adjuster are positioned to one side of the operation panel in a lateral direction of the image forming unit.

16. The multifunctional peripheral apparatus according to claim 15, wherein the first sensor, the illumination light, and the adjuster are positioned at substantially a same height as the operation panel in the vertical direction.

* * * * *